US009292194B2

(12) United States Patent
LaFave et al.

(10) Patent No.: US 9,292,194 B2
(45) Date of Patent: *Mar. 22, 2016

(54) USER INTERFACE CONTROL USING A KEYBOARD

(71) Applicant: MICROSOFT TECHNOLOGY LICENSING, LLC, Redmond, WA (US)

(72) Inventors: Harper LaFave, Seattle, WA (US); Stephen Hodges, Cambridge (GB); James Scott, Cambridge (GB); Shahram Izadi, Cambridge (GB); David Molyneaux, Oldham (GB); Nicolas Villar, Cambridge (GB); David Alexander Butler, Cambridge (GB); Mike Hazas, Lancaster (GB)

(73) Assignee: Microsoft Technology Licensing, LC, Redmond, WA (US)

( * ) Notice: Subject to any disclaimer, the term of this patent is extended or adjusted under 35 U.S.C. 154(b) by 255 days.

This patent is subject to a terminal disclaimer.

(21) Appl. No.: 13/924,852

(22) Filed: Jun. 24, 2013

(65) Prior Publication Data

US 2013/0290910 A1 Oct. 31, 2013

Related U.S. Application Data

(63) Continuation of application No. 12/714,295, filed on Feb. 26, 2010, now Pat. No. 8,471,814.

(51) Int. Cl.
*G06F 3/033* (2013.01)
*G06F 3/0488* (2013.01)
(Continued)

(52) U.S. Cl.
CPC ............ *G06F 3/0488* (2013.01); *G06F 3/0489* (2013.01); *G06F 3/04845* (2013.01)

(58) Field of Classification Search
CPC ... G06F 3/033; G06F 3/04845; G06F 3/0488; G06F 3/0489

USPC .............. 345/156–178; 178/18.01–18.07, 178/20.01–20.04

See application file for complete search history.

(56) References Cited

U.S. PATENT DOCUMENTS

| 5,977,935 A | 11/1999 | Yasukawa et al. |
| 6,320,559 B1 | 11/2001 | Yasukawa et al. |

(Continued)

OTHER PUBLICATIONS

Chan, Chuang, Chia, Hung, Hsu, "A New Method for Multi-Finger Detection Using a Regular Diffuser", retrieved on Dec. 30, 2009 at <<http://ivlab.csie.ntu.edu.tw/Publication%5Cconference%5C2005-2007%5C2007%5CA%20New%20Method%20for%20Multi-Finger%20Detection%20Using.pdf>>, Springer Berlin, Human-Computer Interaction. HCI Intelligent Multimodal Interaction Environments, vol. 4552, 2007, pp. 573-582.

(Continued)

*Primary Examiner* — Vijay Shankar
(74) *Attorney, Agent, or Firm* — Jim Ross; Sonia Cooper; Micky Minhas (57) ABSTRACT

User interface control using a keyboard is described. In an embodiment, a user interface displayed on a display device is controlled using a computer connected to a keyboard. The keyboard has a plurality of alphanumeric keys that can be used for text entry. The computer receives data comprising a sequence of key-presses from the keyboard, and generates for each key-press a physical location on the keyboard. The relative physical locations of the key-presses are compared to calculate a movement path over the keyboard. The movement path describes the path of a user's digit over the keyboard. The movement path is mapped to a sequence of coordinates in the user interface, and the movement of an object displayed in the user interface is controlled in accordance with the sequence of coordinates.

20 Claims, 10 Drawing Sheets (51) Int. Cl.
*G06F 3/0484* (2013.01)
*G06F 3/0489* (2013.01)

(56) References Cited

U.S. PATENT DOCUMENTS

| | | | |
|---|---|---|---|
| 6,600,480 | B2 | 7/2003 | Natoli |
| RE40,153 | E | 3/2008 | Westerman et al. |
| 8,471,814 | B2 * | 6/2013 | LaFave et al. ............. 345/160 |
| 2008/0036743 | A1 | 2/2008 | Westerman et al. |
| 2009/0184921 | A1 | 7/2009 | Scott et al. |
| 2009/0195506 | A1 | 8/2009 | Geidl et al. |
| 2009/0315839 | A1 | 12/2009 | Wilson et al. |

OTHER PUBLICATIONS

Dietz, Eidelson, Westhues, Bathiche, "A Practical Pressure Sensitive Computer Keyboard", ACM Symposium on User Interface Software and Technology (UIST), Oct. 2009, pp. 55-58.

Eaton, Moog, "Multiple-Touch-Sensitive Keyboard", retrieved on Dec. 30, 2009 at <<http://delivery.acm.org/10.1145/1090000/1086019/p258-eaton. pdf?key1=1086019&key2=6799802621&coll=GUIDE&dl=GUIDE&CFID=70233310&CFTOKEN=72440974>>, National University of Singapore, Proceedings of Conference on New Interfaces for Musical Expression (NIME05), May 26, 2005, pp. 258-259.

Rekimoto, Ishizawa, Schwesig, Oba, "PreSense: Interaction Techniques for Finger Sensing Input Devices", retrieved on Dec. 30, 2009 at<<http://www1.cs.columbia.edu/-gblasko/Publications/p203-rekimoto.pdf>>, ACM Symposium on User Interface Software and Technology (UIST), vol. 5, No. 2, 2003, pp. 203-212.

Sporka, Kurniawan, Slavik, "Non-speech Operated Emulation of Keyboard", retrieved on Dec. 30, 2009 at <<http://www.springerlink.com/content/u68w141p186wq273/fulltext.pdf>>, Springer London, Designing Accessible Technology, Chapter 15, 2006, pp. 145-154.

Tomasi, Rafii, Torunoglu, "Full-Size Projection Keyboard for Handheld Devices", retrieved on Dec. 30, 2009 at <<http://delivery.acm.org/10. 1145/800000n92732/p 70-tomasi.pdf? key 1=792732&key2=5113802621 &coll=GUIDE&dl=GUIDE&CFID=70217575&CFTOKEN=36422069>>, Communications of the ACM, vol. 46, No. 7, Jul. 2003, pp. 70-75.

Tosas, Li, "Virtual Touch Screen for Mixed Reality", retrieved on Dec. 30, 2009 at <<http://alereimondo.no-ip.org/MultiTouch/uploads/36/HCI2004_camera.pdf>>, Springer Berlin, Computer Vision in Human-Computer Interaction, vol. 3058, 2004, pp. 48-59.

* cited by examiner

USER INTERFACE CONTROL USING A KEYBOARD

RELATED APPLICATION

This application is a continuation of, and claims priority to, U.S. patent application Ser. No. 12/714,295, filed Feb. 26, 2010, and entitled "USER INTERFACE CONTROL USING A KEYBOARD." The disclosure of the above-identified application is hereby incorporated by reference in its entirety as if set forth herein in full.

BACKGROUND

Graphical user interfaces are widely used to provide human-computer interaction. Many graphical user interfaces require a pointing input from the user in order to control an on-screen cursor, or to manipulate an on-screen object or window. Such pointing input can provided by a pointing device such as a mouse device, touch-pad or trackball. Pointing devices can be characterized as providing indirect interaction, as the user interacts with a separate device to control the on-screen user interface. This can be distinguished from direct interaction methods such as touch-screens, where the pointing input is provided by the user's touch directly manipulating the user interface.

Such is the reliance on pointing input in modern graphical user interfaces that many users are unable to operate the computer without a pointing device or a direct interaction method such as a touch-screen. Whilst most graphical user interfaces provide the ability to control the interface using shortcut keys, the majority of users are unaware of these. Therefore, if a user is presented with a computer without a pointing device, or where the pointing device is broken, the user is likely to be unable to operate the computer.

In addition, the advent of multi-touch interaction has increased the reliance on pointing input as a technique for manipulating a graphical user interface. Multi-touch enables more intuitive and efficient interaction through the use of gestures made using multiple fingers or hands. Multi-touch interaction is becoming increasingly common as a result of increasing availability of multi-touch interaction hardware, such as multi-touch enables touch-pads, touch-screens and mouse devices. As a result, more operating systems and applications are supporting and making use of multi-touch input. However, whilst the operating systems and applications are becoming multi-touch enabled, many users do not have access to the specialized multi-touch interaction hardware that provides multi-touch input. Without such hardware, the user in unable to benefit from the gesture-based control of software that multi-touch provides.

The embodiments described below are not limited to implementations which solve any or all of the disadvantages of known user interfaces.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

User interface control using a keyboard is described. In an embodiment, a user interface displayed on a display device is controlled using a computer connected to a keyboard. The keyboard has a plurality of alphanumeric keys that can be used for text entry. The computer receives data comprising a sequence of key-presses from the keyboard, and generates for each key-press a physical location on the keyboard. The relative physical locations of the key-presses are compared to calculate a movement path over the keyboard. The movement path describes the path of a user's digit over the keyboard. The movement path is mapped to a sequence of coordinates in the user interface, and the movement of an object displayed in the user interface is controlled in accordance with the sequence of coordinates.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a general purpose desktop computing system, the system described is provided as an example and not a limitation. As those skilled in the art will appreciate, the present examples are suitable for application in a variety of different types of computing systems.

Figure 1:
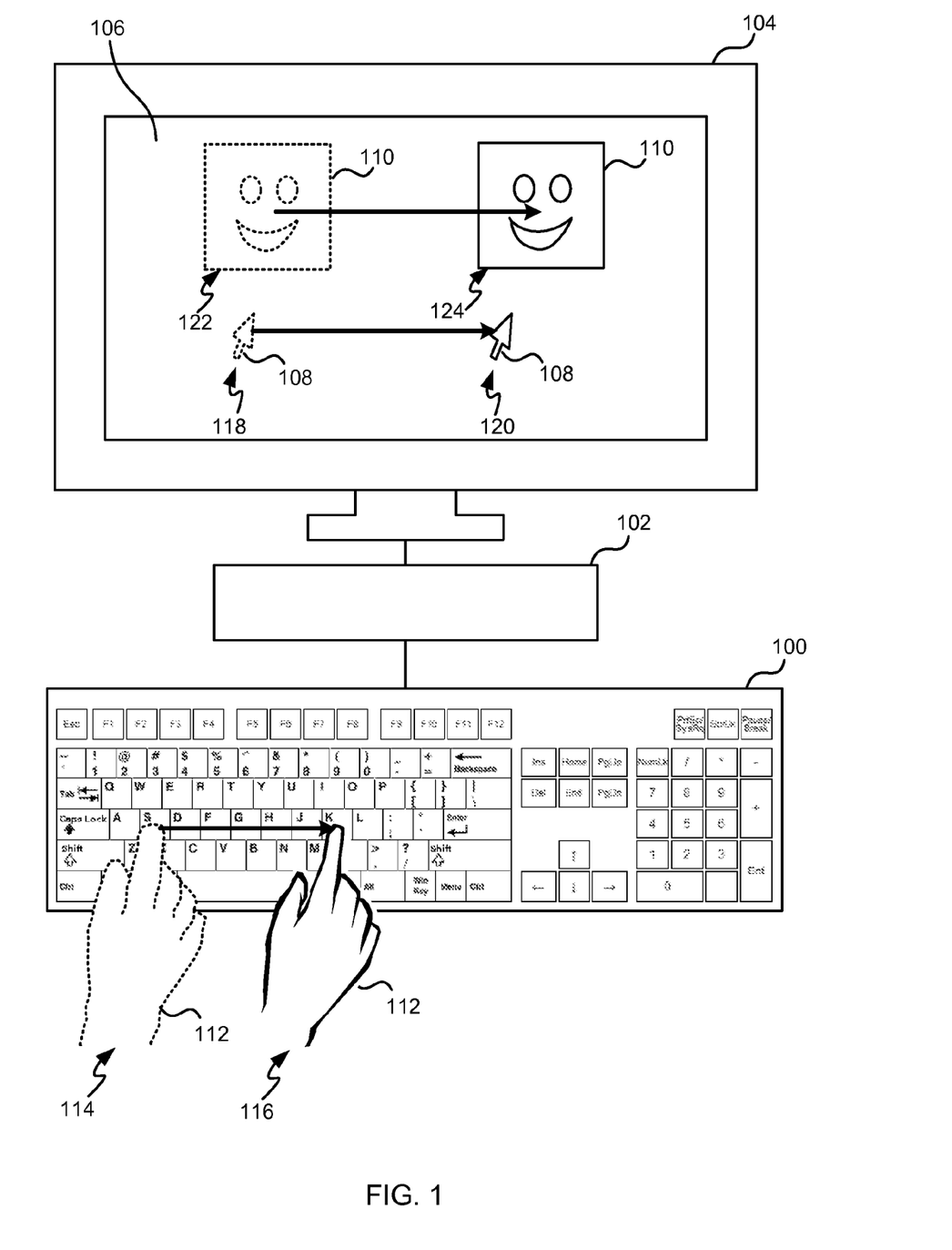
FIG. 1 illustrates the use of a keyboard for single-touch input.

Reference is first made to FIG. 1, which illustrates the use of a keyboard for the provision of pointing or touch input to a graphical user interface. FIG. 1 shows a keyboard 100 connected to a computer 102. The keyboard 100 can be a standard computer keyboard comprising alphanumeric and symbol keys, and which, in normal use, is used for typing and text/data entry. For example, the keyboard can be a standard flexible membrane dome-switch keyboard arranged to communicate with the computer using USB. The keyboard is arranged to provide an input signal to the computer 102 whenever a key is pressed by a user, and also to either continue to provide input to the computer 102 whilst the key is depressed, or provide an additional input when the key is released.

The example of FIG. 1 shows a QWERTY keyboard layout, although other examples can use alternative layouts such as AZERTY, QWERTZ or Dvorak. Alternative examples can also comprise fewer or more keys than the keyboard shown in FIG. 1. For example, an alternative keyboard may not have the numerical keypad at the right hand side.

The computer 102 is also connected to a display device 104, such as a monitor. The computer 102 is arranged to control the display device 104 to display a graphical user interface 106 to the user. The user interface 106 (UI) can comprise elements such as windows, icons, buttons and other controls that are operable under the control of a cursor 108. The graphical user interface 106 can display objects such as images, web-pages, documents and videos. FIG. 1 shows an example image 110 displayed in the user interface 106.

Note that whilst the example of FIG. 1 illustrates the keyboard 100, computer 102 and display device 104 as separate items, in other examples one or more of these can be integrated. For example, the keyboard 100, computer 102 and display device 104 can be integrated into a single unit, in the form of a laptop or notebook computer. The internal structure of the computer 102 is described in more detail with reference to FIG. 10 hereinafter.

In the example of FIG. 1, the user wants to control the user interface 106, but neither a pointing device nor a direct input device are available. In order to enable control of the graphical user interface 106, the computer 102 is configured to interpret key-presses from the user in the form of movements over the keys of the keyboard 100, and convert these movements into user interface controls. In other words, the user can run his fingers over the keys of the keyboard 100 in a similar manner to a touch-pad, pressing the keys as he does so, and the computer interprets these inputs in a similar manner to those from a pointing device.

For example, FIG. 1 illustrates a hand 112 of the user in a first position 114, such that a digit of the hand 112 is pressing the 'S' key on the keyboard 100. The user then moves his hand 112 sideways across the keyboard 100 to a second position 116, such that the digit of the hand 112 is pressing the 'K' key. During the movement, the intermediate keys between 'S' and 'K' (i.e. 'D', 'F', 'G', 'H', and 'J') were pressed.

The keyboard 100 provides this sequence of key-presses ('S', 'D', 'F', 'G', 'H', 'J', 'K') to the computer 102, which interprets them in the same way as a horizontal movement of a pointing device. In a first example shown in FIG. 1, the movement of the user's hand 112 over the keys results in the cursor 108 moving from a first position 118 to a second position 120. The direction and magnitude of the movement of the cursor 108 is related to the direction and magnitude of the movement of the user's hand 112 over the keyboard 100. In a second example shown in FIG. 1, rather than moving the cursor 108, the movement of the user's hand 112 over the keyboard results in the movement of the image 110 from a first position 122 to a second position 124. Again, the direction and magnitude of the movement of the image 110 is related to the direction and magnitude of the movement of the user's hand 112 over the keyboard 100.

The movement of the user's hand 112 over the keyboard 100 can be used to control any aspect of the user interface 106 that is normally controlled with using a pointing device or using a direct input device, and is not limited to the examples of moving a cursor or image as shown in FIG. 1. For example, the movements of the user's hand 112 over the keyboard 100 can be used to trigger graphical user interface actions such as copy/paste, zoom or group.

FIG. 1 illustrates an example of a single-touch input. In other words, the user is only making a single point of contact with the keyboard (e.g. using one finger to draw out a movement in this example). This is distinguished from multi-touch input, as described hereinafter.

Figure 2:
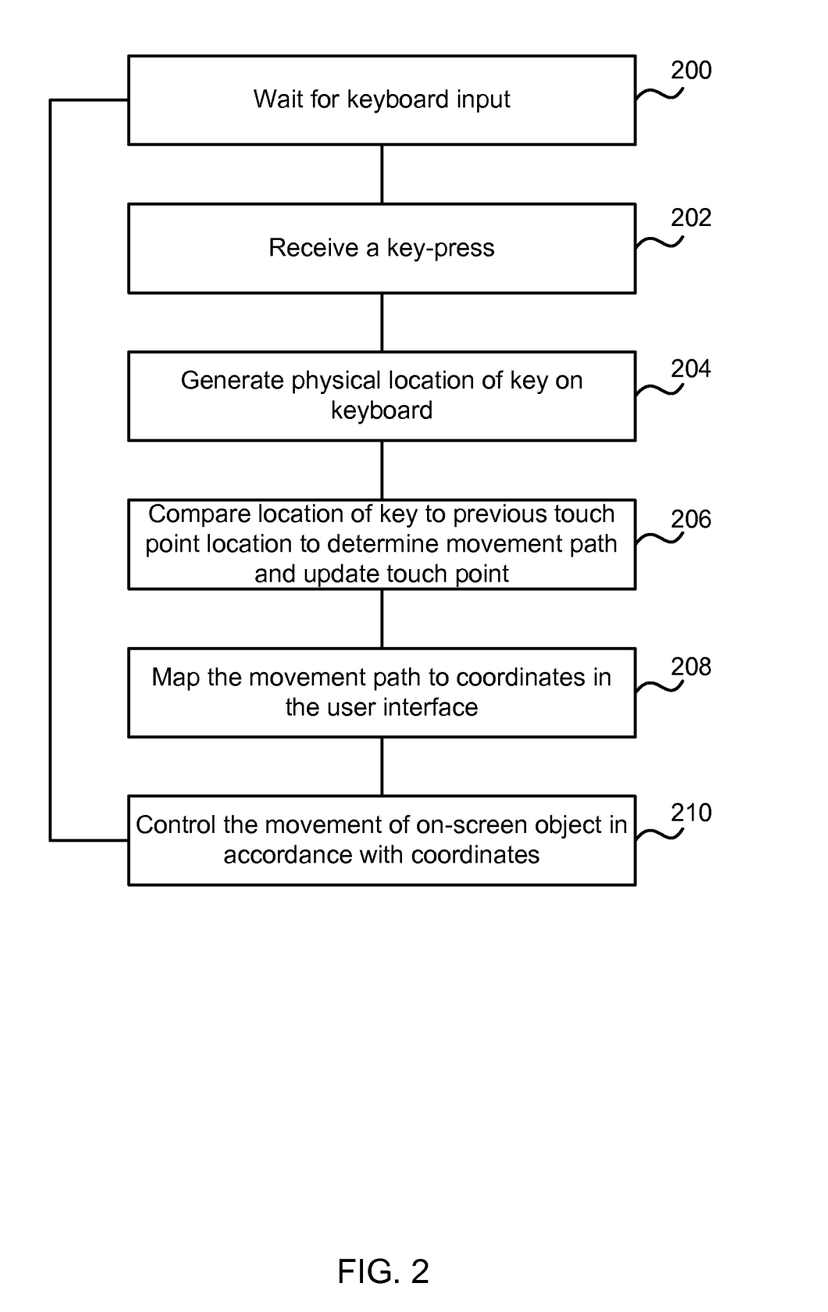
FIG. 2 illustrates a flowchart of a process for controlling an on-screen object using single-touch keyboard input.

Reference is now made to FIG. 2, which illustrates a flowchart of a process performed by the computer 102 for implementing the technique of FIG. 1. Firstly, the computer 102 waits 200 for input from the keyboard 100. A key-press from the keyboard 100 is received 202, and responsive to this the computer 102 generates 204 a physical location on the keyboard for the key-press. The physical location on the keyboard comprises a measure of where the pressed key is located relative to the other keys. For example, this can be in the form of a proportion of the overall length and height of the keyboard (e.g. the 'S' key could be considered to be approximately 20% of the distance horizontally across the keyboard and 50% of the distance vertically up the keyboard as viewed in FIG. 1).

In an alternative example, the physical location can be in the form of coordinates relative to a fixed point on the keyboard (such as the bottom left key) or in terms of physical measurements (e.g. in millimeters) from the fixed point. Physical location information can also include an indication of keys surrounding the pressed key.

To determine the physical location of the key-press, the computer 102 uses information on the layout of the keyboard 100. For example, the computer 102 uses information on whether the keyboard is a QWERTY keyboard, AZERTY keyboard etc. This information can be determined from localization settings of the computer operating system or from hardware settings. Alternatively, the layout of the keyboard can be determined using empirical measurements at the computer. For example, the computer 102 can determine from sequences of keys whether a key is dislocated according to an expected layout. In another alternative, the user can be prompted to manually confirm the keyboard layout when configuring the computer 102.

The physical location of the key-press can be determined from a stored look-up table giving the physical location on the keyboard of each key. Different look-up tables can be stored for different keyboard layouts, and the computer 102 uses the determined layout to select the look-up table to use.

Once the physical location of the key-press has been determined, this is compared 206 to a previous determination of where the user's digit was on the keyboard (if such a determination has previously been performed). The estimate of where the user's digit is on the keyboard 100 is called a touch-point. In other words, a touch-point location is the interpretation of where on the keyboard 100 the user is estimated to be touching at a given time. The touch-point location can be of a higher resolution than the spacing between the keys, as described hereinafter.

If a previous touch-point is stored at the computer 102, then the location of the key-press is compared to the previous touch-point location to determine whether the user's digit has moved, and if so the touch-point location is updated to reflect the key-press location. The calculation of a plurality of touch-points generates a movement path, which terminates at the most recent touch-point. The movement path includes the magnitude and direction of the movement, and optionally the time elapsed since each touch-point was recorded, enabling determination of the velocity of movement.

In one example, the touch-point can be updated to the location of the key-press on the keyboard. In more complex examples, the touch-point can take into account additional parameters, such as the number of the keys being pressed concurrently, and the location of the previous touch-points. These more complex examples are considered in more detail hereinafter with reference to FIG. 6.

If no previous touch-points are present, then a new touch-point can be created at the location of the key-press, as is described in more detail below with reference to FIG. 5.

When the touch-point has been updated to reflect the key-press and the movement path updated, the movement path is mapped 208 to movement in the user interface 106. The movement is translated to new coordinates in the user interface for the object being moved. For example, if the cursor 108 is being moved, then the movement path is translated to an equivalent movement (i.e. related in terms of magnitude and direction) of the cursor 108 in the user interface by determining new coordinates to which to move the cursor 108 from its current location. Various additional calculations can also be applied here, such as acceleration, as described in more detail below. This mapping is similar to the type of mapping performed when translating the movement of a mouse device or finger on a touch-pad to cursor movement.

Once the new coordinates in the user interface 106 for the object have been calculated, the user interface 106 is updated 210 to display the object at the new coordinates. In the example of FIG. 1, the object being moved was cursor 108 or image 110. The process in FIG. 2 then reverts to waiting 200 for more keyboard input, and the process repeats.

The process described above therefore enables a user to control a graphical user interface using only a keyboard by moving their fingers over the keys such that sequences of key-presses are provided to the computer, which can be interpreted into movement paths and translated to on-screen movement. This enables the user interface to be controlled even in the absence of a pointing device.

Note that the flowchart of FIG. 2 covers the process for interpreting sequences of key-presses as movements over the keyboard, but this flowchart does not cover the process for initially creating touch-points or removing touch-points. These aspects are covered hereinafter with reference to FIG. 5. The process can also be improved by taking into account both key-presses and key release events, as discussed below.

Figure 3:
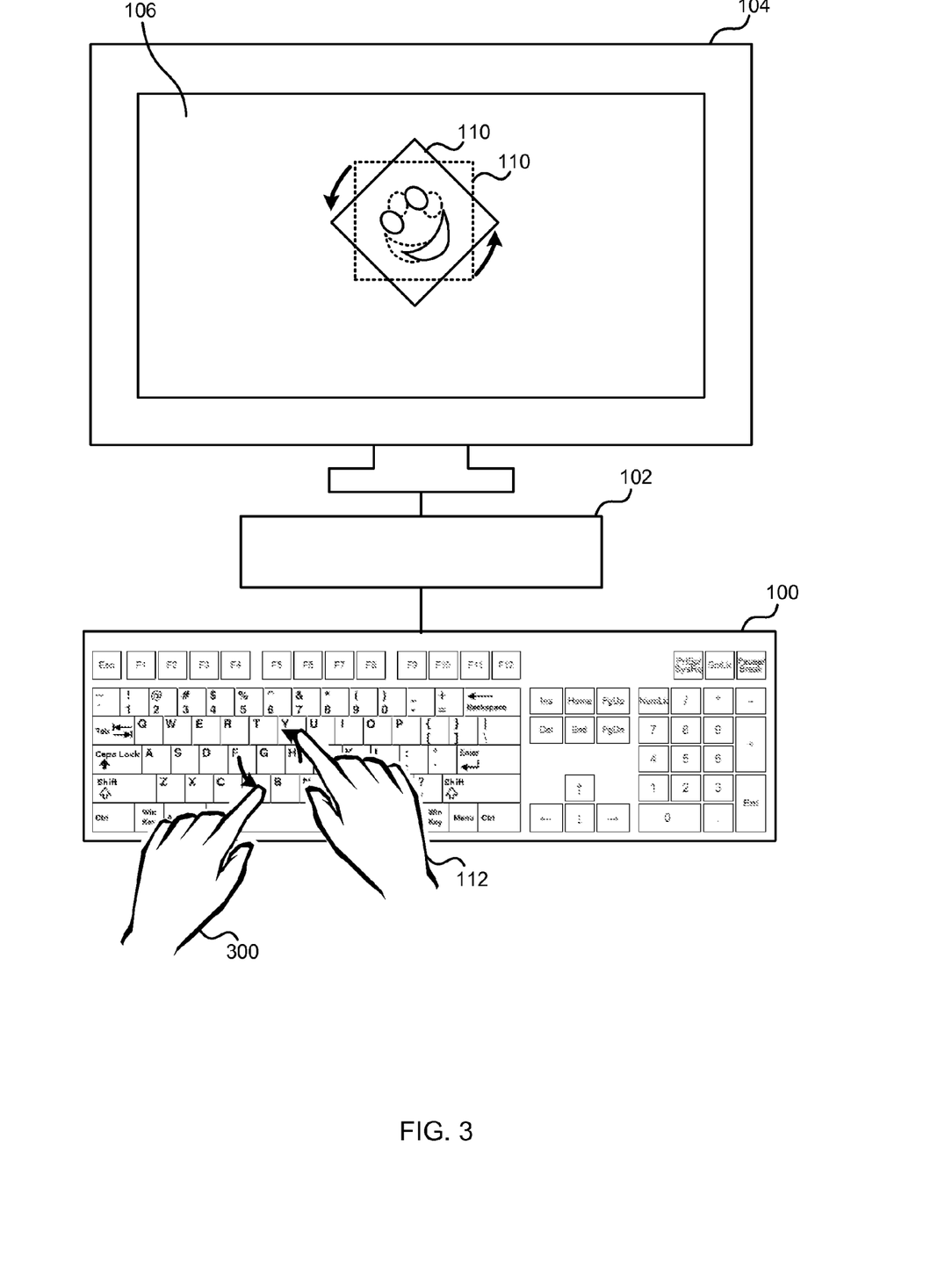
FIG. 3 illustrates the use of a keyboard for inputting a first multi-touch gesture.
Figure 4:
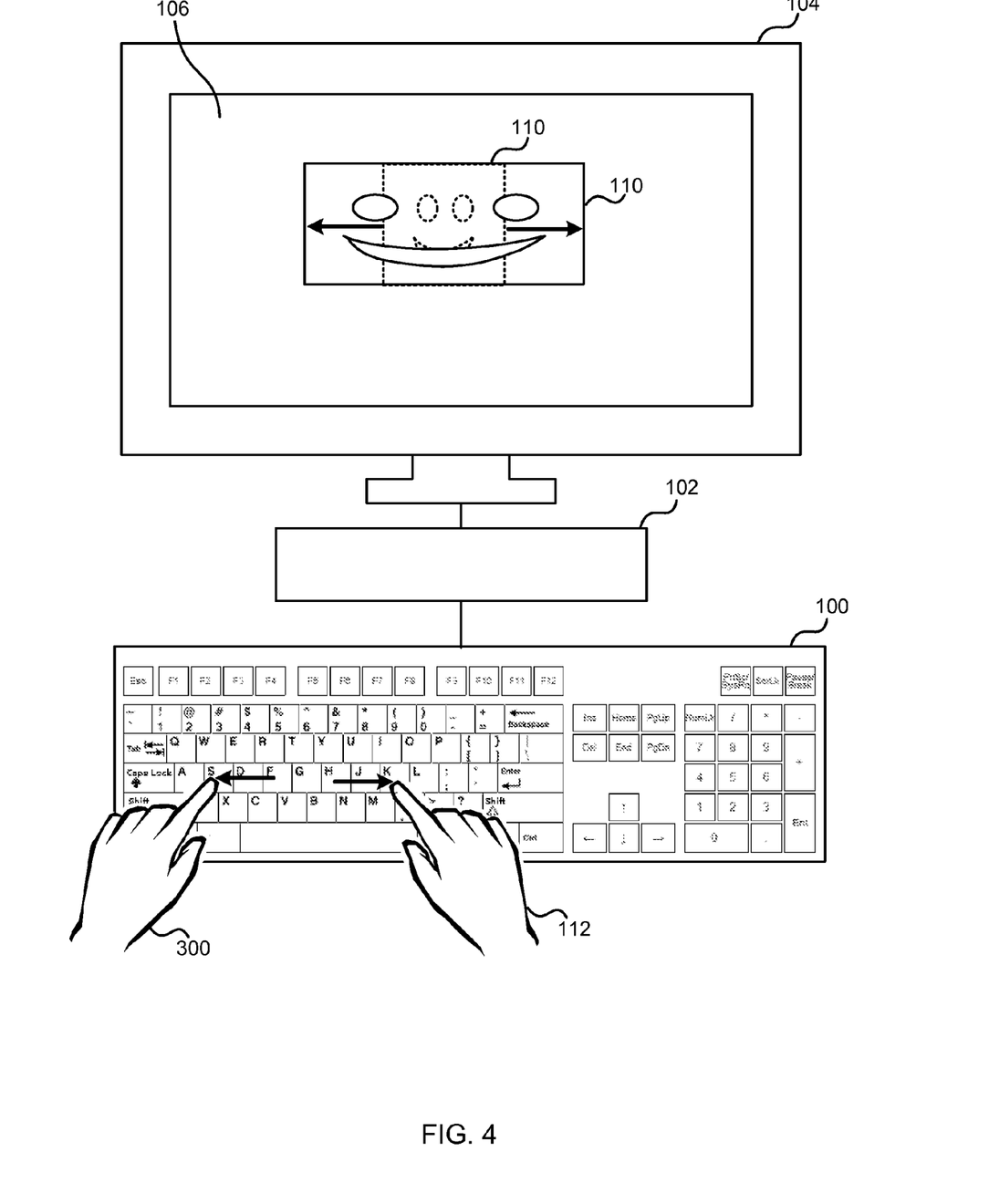
FIG. 4 illustrates the use of a keyboard for inputting a second multi-touch gesture.
Figure 5:
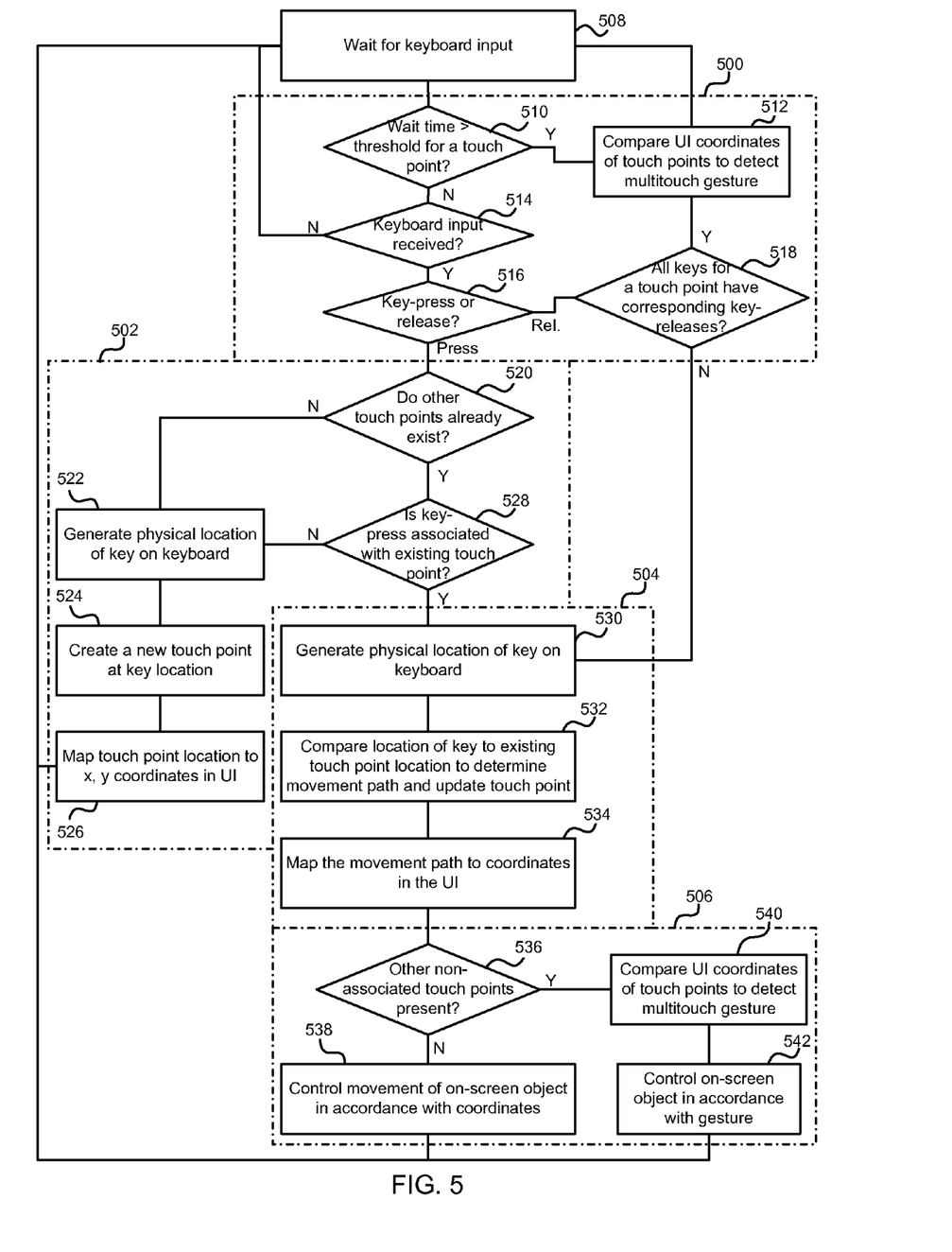
FIG. 5 illustrates a flowchart of a process for controlling an on-screen object using both single-touch and multi-touch keyboard input.

Reference is now made to FIGS. 3 to 5, which illustrate how the operation described above can be enhanced to enable the input of multi-touch input using a keyboard. Reference is first made to FIG. 3, which illustrates use of the keyboard 100 for inputting a first multi-touch gesture. In the example shown in FIG. 3, the keyboard 100 and display device 104 are again connected to computer 102, as with FIG. 1. The user interface 106 is displaying the image 110.

In this example, the user wishes to rotate the image 110 anti-clockwise. To do so, the user uses the first hand 112 and also a second hand 300 on the keyboard 100 to trace two separate arcuate movements. The two digits of the user's hands maintain substantially the same separation, but the angle between them changes. The keys are pressed by the user as the movements are made, and the keyboard input is interpreted by the computer as two separate touch-points (described in more detail below). The change in angle of the two touch-points is detected as a multi-touch gesture for rotation, and a corresponding rotation is applied to the image 110, as shown in FIG. 3.

FIG. 4 illustrates the use of the keyboard 100 for inputting a second multi-touch gesture. In the example of FIG. 4, the user wishes to resize (stretch) the image 110. To perform this action, the user again uses the first hand 112 and the second hand 300 to trace two separate movements. In this case, the two digits pressing the keys maintain substantially the same angle, but the separation between them changes (in this case increases as the hands are drawn apart). The keys are pressed by the user as the movements are made, and the keyboard input is interpreted by the computer as two separate touch-points (described in more detail below). The change in separation of the two touch-points is detected as a multi-touch gesture for resizing, and a corresponding stretching of the image 110 is applied, as shown in FIG. 4.

Note that in other examples additional or alternative multi-touch gestures can be detected, such as gestures for zooming, scrolling, copy/paste, and/or grouping objects. Furthermore, the user does not have to use two hands to perform the gestures, but can also use a plurality of digits from one hand. In order to enable the multi-touch gestures, the computer 102 performs a disambiguation operation to distinguish between the situation where a single digit is pressing multiple keys concurrently, and where a plurality of digits are pressing are pressing multiple keys. This is described in more detail below with reference to FIG. 5.

FIG. 5 illustrates a flowchart of a process for controlling an on-screen object using either single-touch or multi-touch keyboard input. The flowchart of FIG. 5 comprises several main sections—the creation of new touch-points, the removal of inactive touch-points, and the updating of touch-points when movement occurs, and controlling the UI in accordance with the movement. These main sections are indicated in the flowchart of FIG. 5 as follows: section 500 describes the touch-point removal operation; section 502 describes the touch-point creation operation; section 504 describes the touch-point updating operation; and section 506 describes the UI control operation.

Firstly in FIG. 5, section 500 for touch-point removal is performed. The process waits 508 for an input from the keyboard 100. For each active touch-point that the computer 102 is maintaining, the time period since the last update of the touch-point is recorded. It is determined 510 whether the wait time for any of the active touch-points is greater than a threshold. If so, then that touch-point is removed 512, and the process continues waiting 508. In other words, if any touch-point is idle for greater than the threshold, that touch-point is deemed to be inactive and is removed.

If the threshold has not been exceeded, then it is determined 514 whether an input from the keyboard has been received. In no keyboard input is received, the process reverts to waiting 508. The input from the keyboard is in the form of either a key-press event or a key-release event. A key-press event indicates that an identified key on the keyboard 100 has been pressed—i.e. has been changed from an inactive state to an activated state by the user. A key-release event indicates that a an identified key on the keyboard 100 that was previously pressed has now been released by the user—i.e. the user is no longer pressing the key.

Some keyboards can generate the explicit key-press and key-release events. Other keyboards do not generate key-release events, but instead simply repeatedly send a key-press event when a key is held down. The computer 102 can track these repeated key-press events, and translate them into key-press events (the first time the key is activated) and key-release events (when the repeated input stops).

When a keyboard input is received, it is determined 516 whether it is a key-press event or key-release event. If it is a key-release event, it is checked which touch-point the key-release event relates to and it is determined 518 whether all the key-press events for that touch-point now have corresponding key-release events. If so, this indicates that the user is now no longer touching the keyboard at that touch-point, and the touch-point is removed 512. If not, then the touch-point is updated as described later with reference to section 504.

If it is determined 516 that a key-press event has occurred, then the process moves into section 502. It is determined 520 whether other active touch-points are present. If not, then this means that a new touch-point for the key-press should be created (as there is no possibility that the key-press relates to an existing touch-point). A physical location on the keyboard 100 is generated 522 for the key-press, as described above with reference to FIG. 2. Once the physical location for the key-press has been generated, a new touch-point is created 524 at the physical location. The newly created touch-point is mapped 526 to on-screen coordinates in the user interface 106. The mapping of the touch-point to on-screen coordinates can be performed in a number of ways. For example, the whole user interface can be directly mapped to the touch-point, such that the position on the keyboard of the user's touch relates to the location on the whole of the user interface (as described in more detail with reference to FIG. 7). Alternatively, only a portion of the user interface can be mapped to the touch-point location (as described in more detail with reference to FIG. 8).

Figure 7:
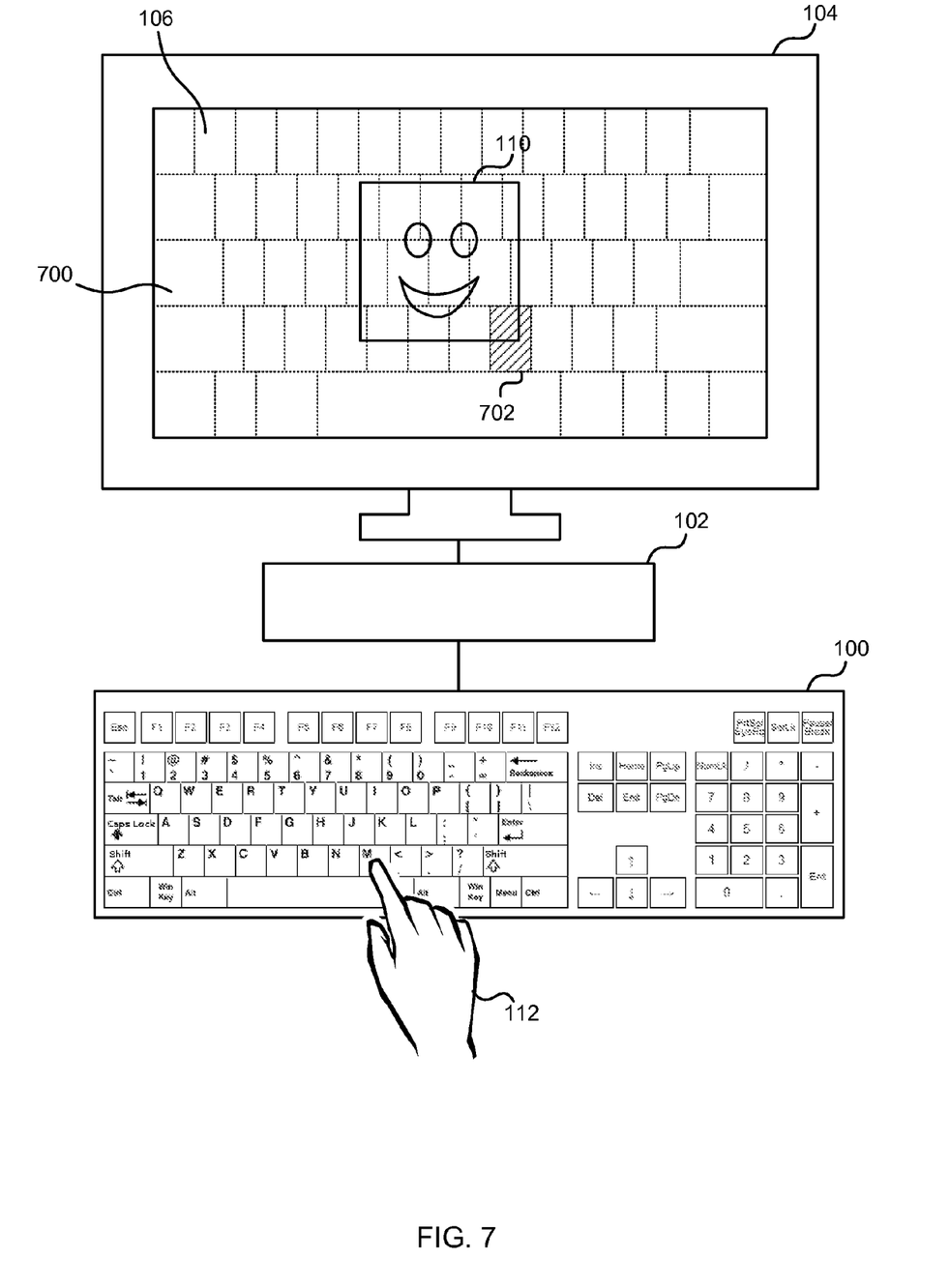
FIG. 7 illustrates a user interface overlay for increasing touch input accuracy.
Figure 8:
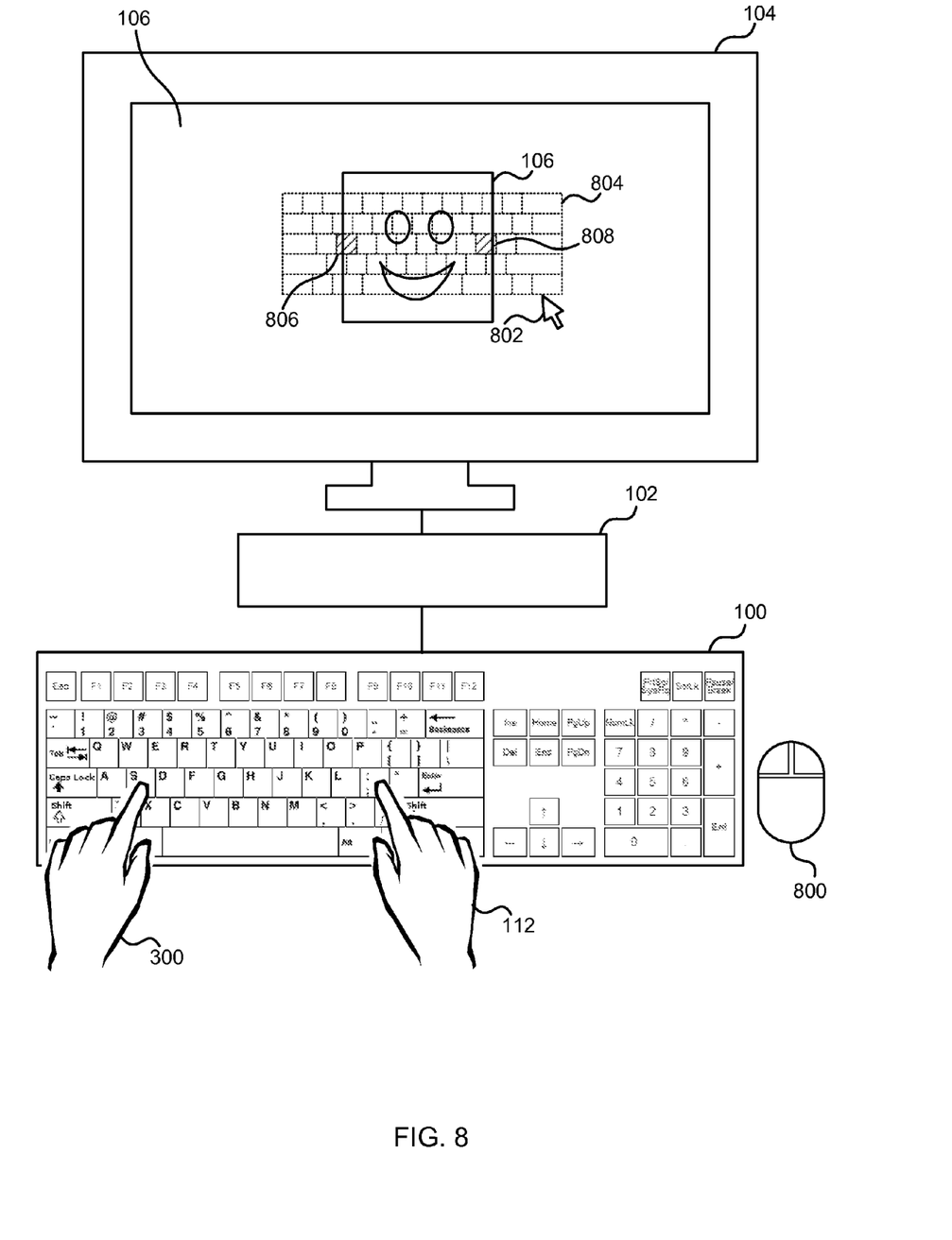
FIG. 8 illustrates a moveable user interface overlay.

With a newly created touch-point, no movement has occurred, so no movement of objects in the user interface results. However, the user interface can optionally change responsive to the new touch-point. For example a cursor can be created at the mapped location, or another visual indication of the location can be presented to the user (e.g. as shown in FIGS. 7 and 8).

Once the newly created touch-point is mapped 526 to on-screen coordinates in the user interface 106, the process reverts to waiting 508 for more keyboard input.

If it was determined 520 that other active touch-points were present, then it is determined 528 whether the key-press is associated with one of the active touch-points. In other words, it is determined whether this key-press constitutes the start of a new touch on the keyboard (e.g. the user touching the keyboard with a new digit) or whether it is the continuation of a previous movement. This step therefore performs the disambiguation that enables separate touch-points to be distinguished and hence enabling multi-touch input.

To determine whether a key-press is associated with another touch-point the knowledge of the keyboard layout (as used to generate the physical location described above) can be used. The knowledge of the keyboard layout enables the keys in the vicinity of the key-press to be determined. For example, the keys adjacent to (i.e. surrounding) the pressed key can be determined. It can then be ascertained whether the existing touch-point resulted from one or more of the adjacent keys. If the pressed key is adjacent to another key used to generate a touch-point, it is likely that it is the same digit of the user activating the pressed key (i.e. moving from the adjacent key to the pressed key). The existing touch-point can then be updated, rather than a new touch-point created.

The timing of key-presses can also be used to further enhance the disambiguation of key-presses. For example, if there is a time difference greater than a predefined value between the pressing of a key and the subsequent pressing of a key in its vicinity, then this indicates that the user's finger is moving from one key to another over time. This can be distinguished from the case where the user's digit presses multiple adjacent keys at substantially the same time, which can be interpreted as single touch-point at an intermediate location between the keys, as opposed to a movement between these keys (this is described in more detail with reference to FIG. 6). Similarly, if two keys are pressed substantially simultaneously, and the keys are not adjacent to each other, then this indicates that they relate to two separate touch-points by two independent digits (as opposed to a single digit movement where, for example an intermediate key failed to be registered as a key-press).

If it was determined 528 that the key-press was not associated with another pre-existing touch-point, then this means that the key-press relates to a new touch-point, and a physical location is generated 522, a new touch-point created 524 and mapped 526 to coordinates in the user interface 106, as described above.

If, however, it was determined 528 that the key-press was associated with another pre-existing touch-point, then this means that the existing touch-point should be updated, as covered by section 504. In addition, section 504 is entered if it was determined 518 that a key-release event occurred, but there were still other active key-press events for a touch-point. This is because this scenario can only occur if multiple keys were concurrently pressed, but one of these has now been released (leaving at least one still pressed). In this situation, the touch-point can be considered to have moved, due to one of the keys no longer being pressed, and hence the touch-point is updated.

The physical location of the key-press or key-release on the keyboard 100 is generated 530, as described above with reference to FIG. 2. The physical location is compared 532 to the previous touch-point with which the key-press or release is associated, and a new value for the touch-point calculated (as described with reference to FIG. 6 below). In the case of a key-press, the updated touch-point location can correspond with the physical location of the key-press, or be somewhere between the previous touch-point and the key-press. In the case of a key-release, the updated touch-point location can correspond with the physical location of the most recent associated key-press, or be somewhere between the previous touch-point and the most recent associated key-press.

The updated touch-point location is added to the movement path, to indicate the direction and magnitude of the movement of the user's digit, and the movement is them mapped 534 to the user interface to determine the on-screen extent of the movement.

Then, in section 506, the user interface 106 is controlled in accordance with the detected and mapped movement. It is determined 536 whether only the touch-point in question is currently active. If so, this indicates that this is a single-touch movement, and the on-screen object (cursor, window, image, etc) is moved 538 in accordance with the mapped movement (as described with reference to FIG. 2). The process then reverts to waiting 508 for more input.

If, however, it is determined 536 that that other touch-points are also present, then this indicates a multi-touch input. The mapped movement in the user interface is compared 540 to the other touch-points present to detect a multi-touch gesture. For example, it can be determined with either or both of the angle and separation between the touch-points is changing with the movement. As mentioned above, for example, a change of angle indicates a multi-touch rotation gesture and a change of separation indicates a resizing gesture.

The object in the user interface 106 is then controlled 542 in accordance with the detected multi-touch gesture. For example the object is rotated by an amount relating to the change in angle between the user's digits on the keyboard, or the object is re-sized by an amount relating to the change in separation of the user's digits on the keyboard. The process then reverts to waiting 508 for more input.

Figure 6:
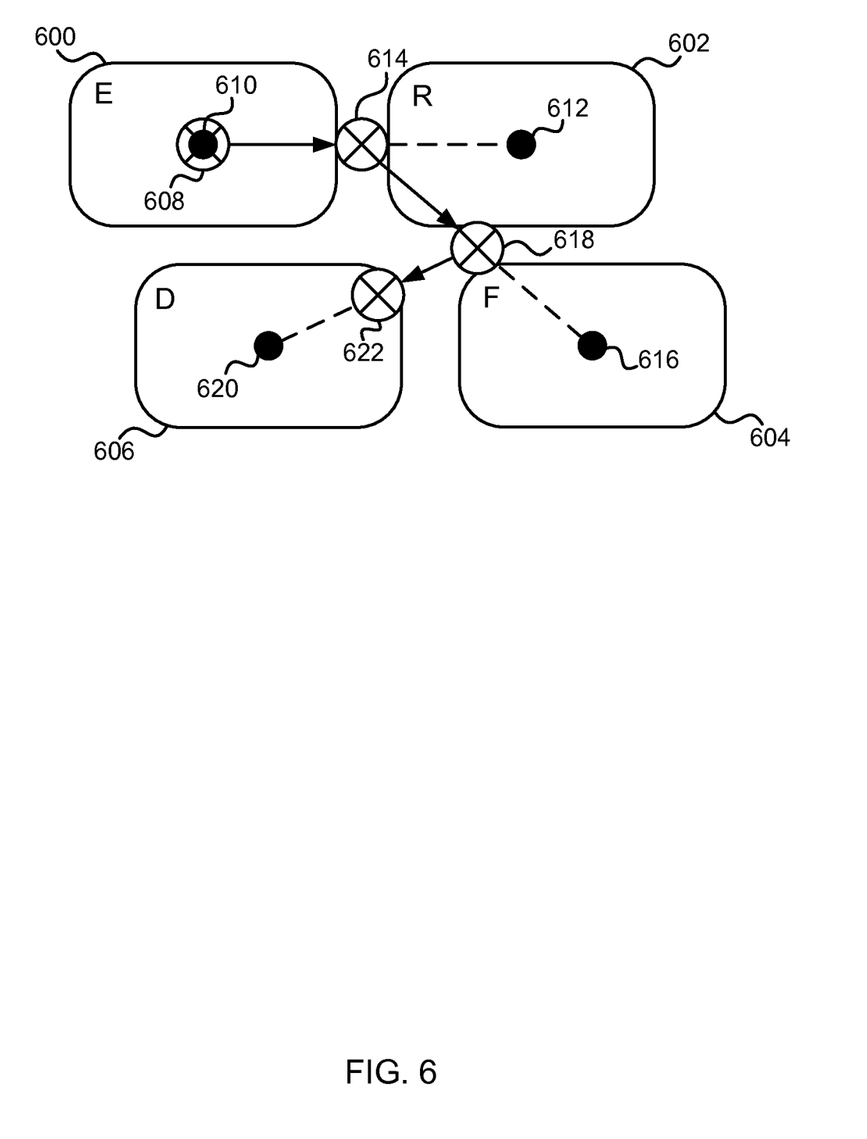
FIG. 6 illustrates a technique for increasing touch input resolution on a keyboard.

Reference is now made to FIG. 6, which illustrates a technique for increasing the resolution of touch-point locations above that of the spacing of the keys on the keyboard 100. In the simplest case, the touch-point locations can be determined to be the center point of the most recently pressed key. However, given this limits the touch-point locations to a resolution no greater than the spacing between the keys. By taking into account whether more than one key is pressed concurrently, and the sequence they are pressed in, the touch-point location resolution can be increased by interpolation.

FIG. 6 illustrates an example showing the keys 'E' 600, 'R' 602, 'F' 604, and 'D' 606. Firstly, the 'E' 600 key is pressed by the user. This creates a new touch-point location 608. Because this is a new touch-point, its location is the 'E' key centre 610. Shortly after 'E' 600 is pressed, 'R' 602 is pressed, without 'E' being released. This can either occur because the user's digit is being moved towards 'R' 602, but is still in contact with 'E' (e.g. midway between the keys) or because the user's digit was between 'E' and 'R' when the keys were first pressed, but the pressing of 'E' was registered first by the keyboard. When two keys are pressed concurrently like this, the touch-point location can be set to the mid-point between the previous touch-point location (the centre 608 of 'E') and the center 612 of the most recently pressed key, 'R'. This results in the new touch-point location 614 halfway between 'E' and 'R'. This more accurately locates the touch-point compared to simply moving the touch-point to the center 612 of 'R', the most recently pressed key.

Note that if the 'E' key was now released, then the key-release event is registered, and the touch-point location is updated to the interpolated location of the remaining pressed keys (in this case only the 'R' key, and hence the touch-point updated to the center 612 of the 'R' key).

If the 'F' 604 key was pressed next, whilst the 'E' 600 and 'R' 602 keys were still pressed, then the touch-point again updates to the mid-point between the previous touch-point location 614 and the centre 616 of the most recently pressed key, 'F' 604. This results in a new touch-point location 618. Note that this new touch-point location 618 is not the same as the geometric mean of the centers of each the keys 'E', 'R' and 'F', but is instead weighted towards the 'F' key in view of the fact that this key was most recently pressed. However, the geometric mean can be used as a technique for determining the touch-point location in other examples.

If the 'D' 606 key was pressed next, whilst 'E' 600, 'R' 602 and 'F' 604 were still pressed, then the touch-point again updates to the mid-point between the previous touch-point location 618 and the centre 620 of the most recently pressed key, 'D' 606. This results in a new touch-point location 622. Again, this new touch-point location 622 is not the same as the geometric mean of the centers of each the four keys, but is instead weighted towards the 'D' key in view of the fact that this key was most recently pressed.

The above-described technique therefore increases the resolution of the touch-point location by taking into account both whether a plurality of keys are pressed concurrently, and the sequence in which they were pressed.

Further additional techniques can also be used for increasing the resolution of the input above that of the spacing between the keys. For example, and acceleration algorithm can be applied to movements over the keyboard, such that the speed of movement dynamically affects the mapping of the distance moved on the keyboard to the distance moved on the user interface. This is similar to acceleration or 'ballistics' algorithms used with pointing devices. If a given movement is determined to be fast on the keyboard, then this is translated to a larger movement on the user interface than the same movement on the keyboard but performed more slowly. This non-linear response gives the effect of having different resolution inputs depending on the speed at which movements are performed.

Another technique for increasing the resolution of the input using the keyboard is to progressively reduce the area of the user interface that responds to the keyboard over the course of a gesture. For example, considering the example of FIG. 3, before the gesture is started, the keyboard area is mapped directly to the whole user interface (such that the bottom left corner of the keyboard 100 where the 'Ctrl' key is maps to the bottom left of the user interface 106, and the top right corner of the keyboard 100 where the 'backspace' key is maps to the top right of the user interface 106). Once the gesture to rotate the image 110 is started, the computer determines that input to the rest of the user interface is not currently needed, and changes the mapping (progressively over time in one example) such that the whole keyboard maps only onto the portion of the user interface containing the image 110. Therefore, because the whole keyboard maps to a smaller area of the user interface, the effect is the same as increasing the resolution of the input, enabling the image to be manipulated with greater accuracy.

A further technique to increase perceived resolution is to distinguish between coarse and fine gestures on the keyboard. A course gesture can be considered to be one in which many keys are pressed concurrently, e.g. if the user is using the side of his hand, or a number if digits bunched together to input movements on the keyboard. The computer 102 can detect these course gestures, and map them to larger movements on the user interface. Conversely, fine movements are those when the user is only using a single digit, and does not press many keys concurrently, except when transitioning between keys during the movement. The computer 102 can detect these fine gestures, and map them to smaller movements on the user interface, thereby increasing the perceived resolution.

Similarly, different areas of the keyboard can be used to enter coarse and fine gestures. For example, the numeric keypad region can be used to enter coarse, large-scale, movements, and the QWERTY (or equivalent) part of the keyboard used to enter fine gestures. In another example, different keyboard states can be used to change to the type of interaction. For example, the caps lock key sets the keyboard into a distinct, detectable state, and this can be utilized such that when the caps lock state is activated the movements on the keyboard are mapped to smaller movements on the user interface (i.e. higher resolution).

Other techniques can also be applied to increase the accuracy of input when using a keyboard in this way. The use of a keyboard for pointing input or gestures is indirect, in that the user is not directly interacting with the display device. This can make it difficult for the user to visualize where a touch on the keyboard will correspond to in the user interface. To address this, an overlay representing the keyboard can be placed over the user interface, as illustrated in FIG. 7.

FIG. 7 shows the keyboard 100 connected to computer 102, which is also connected to display device 104 and is displaying user interface 106. The user interface 106 comprises image 110. If the user wants to manipulate the bottom right hand corner of the image 110, then it can be difficult for them to know where to touch on the keyboard 100. To avoid this, a semi-transparent overlay 700, which shows the keys of the keyboard (optionally with or without key labels) overlaid on top of the user interface. In the example of FIG. 7, the keyboard 100 maps to the whole user interface 106, and hence the overlay 700 covers the whole user interface 106. From the overlay 700, the user knows that the bottom right hand corner of the image 110 maps to the 'M' key. Optionally, as keys are pressed on the keyboard 100, this can be indicated on the overlay 700. For example, FIG. 7 shows the user pressing the 'M' key, and a corresponding portion 702 of the overlay 700 is highlighted.

FIG. 8 shows an alternative overlay example which does not cover the whole user interface 106. In the example of FIG. 8, a pointing device 800 is present, which can provide pointing (single-touch) input, and the keyboard 100 is used to provide multi-touch input. The pointing device 800 controls the movement of a cursor 802 in the user interface 106. An overlay 804 in the form of a representation of the keyboard is shown overlaid on the user interface 106. The overlay 804 can be semi-transparent. The overlay 804 is smaller than that shown in FIG. 7, and hence can be used to control a smaller area of the user interface, thereby giving a finer degree of control. In order to control which portion of the user interface the keyboard 100 is interacting with, the overlay 804 is movable. The overlay 804 can be arranged to move with the cursor 802, under the control of the pointing device. This enables the user to position the overlay 804 over the portion of the user interface that they want to control using multi-touch input.

For example, as shown in FIG. 8, the user has used the pointing device 800 to position the overlay over the image 110. The user can see from the overlay 804 that to manipulate the sides the image (e.g. to resize the image to a smaller size) that the gesture starts from keys 'S' and ':'. Optionally, as keys are pressed on the keyboard 100, this can be indicated on the overlay 804. For example, FIG. 8 shows the user pressing the 'S' and ':' keys, and corresponding portions 806 and 808 of the overlay 804 being highlighted.

In some examples, the user can control the size of the overlay to be any size between that shown in FIG. 7 and that shown in FIG. 8, or smaller. The overlays shown in FIGS. 7 and 8 therefore increase the usability and accuracy of touch input from a keyboard.

Figure 9:
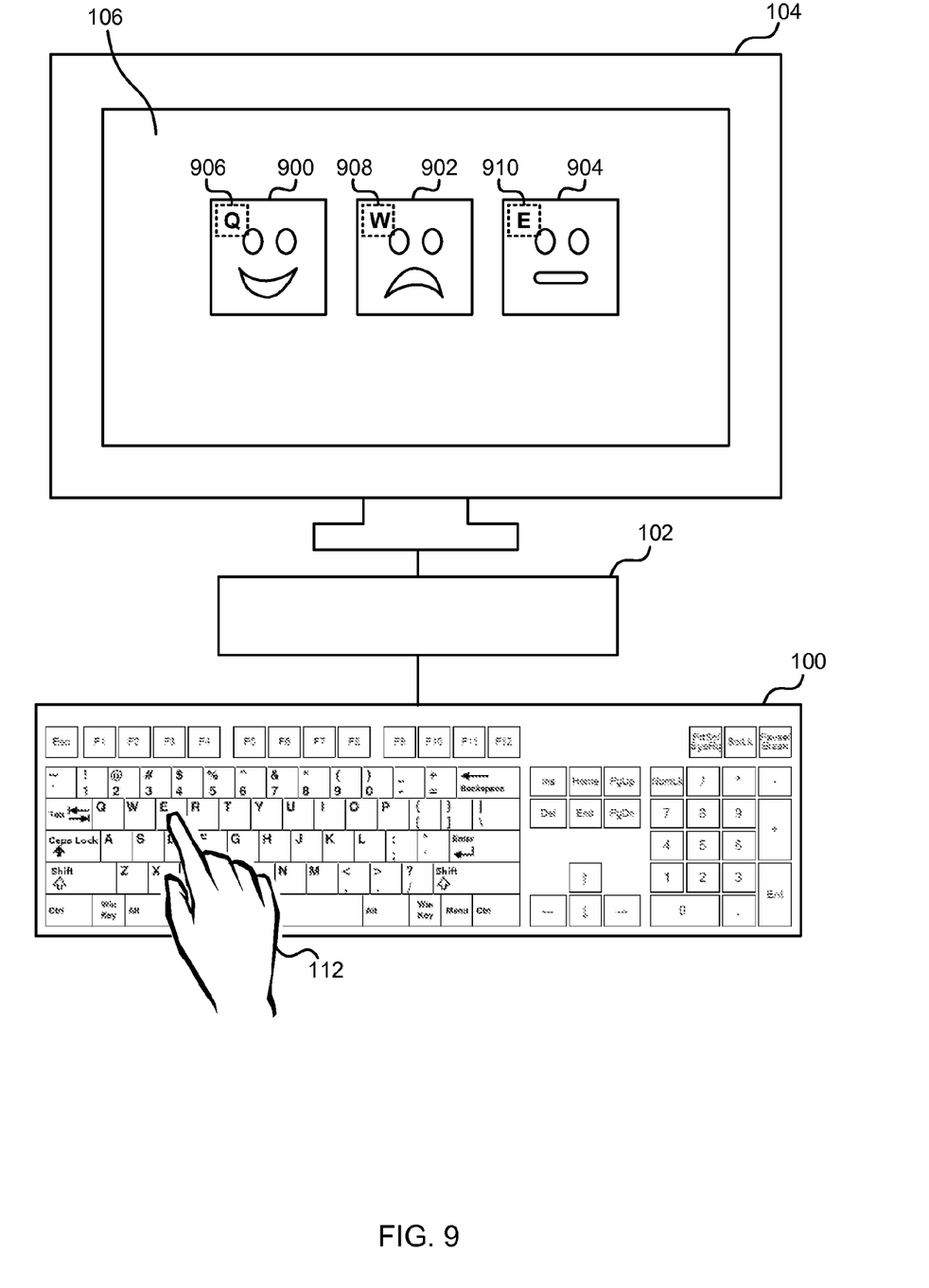
FIG. 9 illustrates the use of the keyboard for selecting objects to manipulate.

FIG. 9 illustrates a technique for enabling the keyboard to select on-screen objects to manipulate. In this example, three objects are displayed in the user interface 106: a first object 900, a second object 902, and a third object 904. The computer 102 has overlaid a representation of a different key over each object. In this example, the first object 900 is overlaid with a representation of the 'Q' key 906, the second object is overlaid with a representation of the 'W' key 908, and the third object is overlaid with a representation of the 'E' key 910.

Overlaying distinct keys over different objects enables the user to determine which key maps to which object. In one example, the user can start interacting with an object after pressing the key indicated as a selector. For example, the user can press the 'E' key 910 to start interacting with the third object 904 (e.g. using the keyboard interaction techniques described above). Alternatively, the user can double press the key associated with an object to distinguish the key-press from other gestures or inputs that can be made.

This selection technique enables keyboard input having multiple states: one where user interactions are specific to a selected object (e.g. the multi-touch gestures described above), and one where user interactions are more generic to the overall user interface (such as those which are not directed to a specific object or involve multiple objects—examples include copy, zoom and group). As an example, the user can press the 'E' key 112, and then use the keyboard to manipulate just the third object 904. When the user is finished, the third object 904 can be de-selected (e.g. using a specific key such as Escape) to move to interacting with the overall user interface, or a new object selected (e.g. double-pressing the 'W' key 908 to move to interacting with the second object 902).

Figure 10:
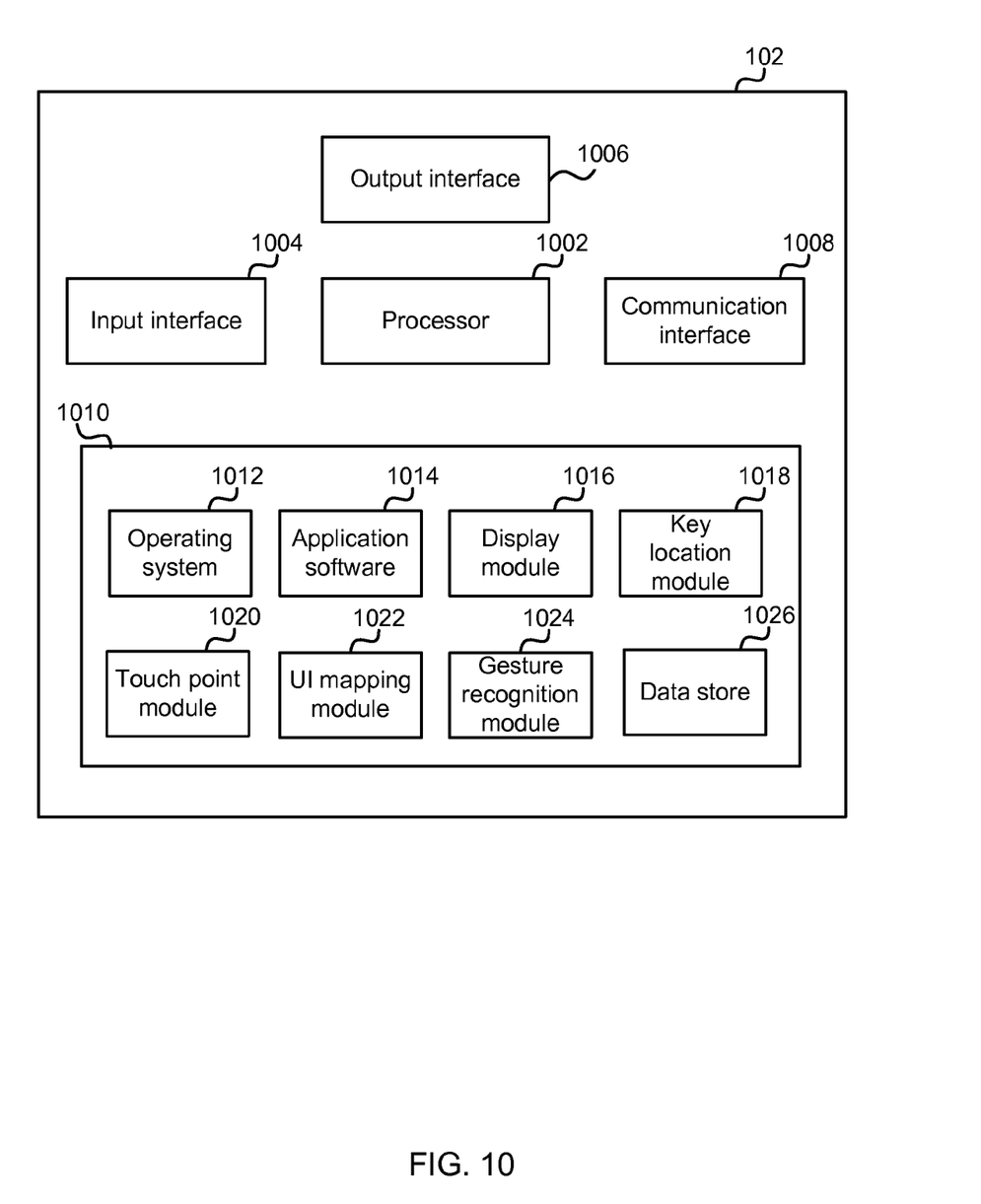
FIG. 10 illustrates an exemplary computing-based device in which embodiments of the keyboard touch input can be implemented.

FIG. 10 illustrates various components of an exemplary computing-based device, such as computer 102, which can be implemented as any form of a computing and/or electronic device, and in which embodiments of the keyboard-based touch-input can be implemented.

The computer 102 comprises one or more processors 1002 which may be microprocessors, controllers or any other suitable type of processors for processing computing executable instructions to control the operation of the device in order to detect, interpret and act upon touch-based inputs from a keyboard.

The computer 102 comprises one or more input interfaces 1004 which are of any suitable type for receiving data from user input devices such as keyboard 100 and/or pointing device 1000. An output interface 1006 is arranged to output display information to display device 104 which can be separate from or integral to the computer 102. The display information provides the graphical user interface 106. Optionally, a communication interface 1008 can be provided for data communication with one or more networks, such as the internet.

Platform software comprising an operating system 1012 or any other suitable platform software can be provided at the computing-based device to enable application software 1014 to be executed on the computer 102. Other software functions can comprise one or more of:

A display module 1016 arranged to control the display device 104, including for example the display of an overlay in the user interface;
A key location module 101 8 arranged to determine the location of a given key using the keyboard layout;
A touch-point module 1020 arranged to estimate the location of a digit of the user on the keyboard from the key-presses;
A UI mapping module 1022 arranged to convert a touch-point location on the keyboard to a location in the user interface;
A gesture recognition module 1024 arranged to analyze the touch-point location data and/or movement data and detect user gestures; and
A data store 1026 arranged to store keyboard layouts, movement paths, images, etc.

The computer executable instructions may be provided using any computer-readable media, such as memory 1010. The memory is of any suitable type such as random access memory (RAM), a disk storage device of any type such as a magnetic or optical storage device, a hard disk drive, or a CD, DVD or other disc drive. Flash memory, EPROM or EEPROM may also be used. Although the memory is shown within the computer 102 it will be appreciated that the storage may be distributed or located remotely and accessed via a network or other communication link (e.g. using communication interface 1008).

The term 'computer' is used herein to refer to any device with processing capability such that it can execute instructions. Those skilled in the art will realize that such processing capabilities are incorporated into many different devices and therefore the term 'computer' includes PCs, servers, mobile telephones, personal digital assistants and many other devices.

The methods described herein may be performed by software in machine readable form on a tangible storage medium. Examples of tangible (or non-transitory) storage media include disks, thumb drives, memory etc and do not include propagated signals. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

Any range or device value given herein may be extended or altered without losing the effect sought, as will be apparent to the skilled person.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method blocks or elements identified, but that such blocks or elements do not comprise an exclusive list and a method or apparatus may contain additional blocks or elements.

It will be understood that the above description of a preferred embodiment is given by way of example only and that various modifications may be made by those skilled in the art. The above specification, examples and data provide a complete description of the structure and use of exemplary embodiments of the invention. Although various embodiments of the invention have been described above with a certain degree of particularity, or with reference to one or more individual embodiments, those skilled in the art could make numerous alterations to the disclosed embodiments without departing from the spirit or scope of this invention.

The invention claimed is:

1. A tangible storage medium storing computer-readable instructions that when executed by one or more processors produce actions comprising:
   receiving data comprising a first sequence of key-presses from a first set of adjacent keys on the keyboard and a second sequence of key-presses from a second set of adjacent keys on the keyboard, wherein the first and second set do not intersect;
   mapping the sequence of key-presses to a first sequence of coordinates in the user interface and the second sequence of key-presses to a second sequence of coordinates in the user interface;
   comparing the first and second sequence of coordinates to detect a multi-touch gesture;
   controlling movement of an object displayed in the user interface in accordance with the multi-touch gesture.

2. A tangible storage medium according to claim 1, wherein the step of comparing the first and second sequence of coordinates to detect a multi-touch gesture comprises comparing at least one of the distance and angle between the first and second sequence of coordinates.

3. A method of controlling a user interface displayed on a display device using a computer connected to a keyboard having a plurality of alphanumeric keys for text entry, the method comprising:
   receiving, at the computer, data comprising a sequence of key-presses from the keyboard;
   mapping the sequence of key-presses to a sequence of coordinates in the user interface; and
   controlling movement of an object displayed in the user interface in accordance with the sequence of coordinates.

4. A method according to claim 3, further comprising calculating a movement path over the keyboard from the sequence of key-presses, the movement path including a touch-point location, and each key-press updating the touch-point location.

5. A method according to claim 4, wherein the data further comprises a sequence of key-release events.

6. A method according to claim 5, wherein each key-release updates the touch-point location.

7. A method according to claim 6, further comprising the step of using the sequence of key-presses and key-release events to detect that a plurality of adjacent keys are pressed concurrently.

8. A method according to claim 7, wherein calculating the movement path over the keyboard from the sequence of key-presses includes, in the case that adjacent keys are pressed concurrently, interpolating between the physical locations of the plurality of adjacent keys to create an interpolated location, and updating the touch-point location to the interpolated location.

9. A method according to claim 7, wherein calculating the movement path over the keyboard from the sequence of key-presses includes, in the case that adjacent keys are pressed concurrently, interpolating between the physical location of the key most recently pressed and the touch-point location to create an interpolated location, and updating the touch-point location to the interpolated location.

10. A method according to claim 3, further comprising comparing the sequence of coordinates to a further independent sequence of coordinates to detect a multi-touch gesture, and the step of controlling movement of the object including controlling movement of the object displayed in the user interface in accordance with the multi-touch gesture.

11. A method according to claim 10, wherein the data further comprises a further sequence of key-presses on the keyboard, and the further independent sequence of coordinates is generated from the further sequence of key-presses.

12. A method according to claim 11, wherein the further sequence of key-presses and sequence of key-presses in the data do not overlap.

13. A method according to claim 1, further comprising detecting that all key-presses have corresponding key-release events, and resetting the movement path by deleting the touch-point location.

14. A method according to claim 1, further comprising detecting that neither a key-press event or key-release event has occurred for a predetermined time period, and resetting the movement path by deleting the touch-point location.

15. A computer system, comprising:
a display device;
a keyboard having a plurality of alphanumeric keys for text entry; and
a processor arranged to display a user interface on the display device, receive data from the keyboard comprising a sequence of key-presses from a user, calculate a movement path of the user's digit over the keyboard from the sequence of key-presses, map the movement path to a sequence of coordinates in the user interface, and control movement of an object displayed in the user interface in accordance with the sequence of coordinates.

16. A computer system according to claim 15, wherein the processor is further arranged to display a representation of the keyboard on the display device overlaid on the user interface, and indicate the movement path on the representation.

17. A computer system according to claim 16, wherein the computer system further comprises a pointing device, and the processor is arranged to move the representation responsive to input from the pointing device, such that the representation can be moved over a selected object displayed in the user interface to be controlled by the keyboard.

18. A computer system according to claim 15, wherein the computer system further comprises a data store, and the processor is arranged to determine the keyboard layout and access a table stored on the data store mapping each key to a location for the layout.

19. A computer system according to claim 15, wherein the object displayed in the user interface is at least one of: a cursor; a window; an image; a web-page; a document; and a video.

20. A computer system according to claim 15, wherein the keyboard is a QWERTY keyboard.

* * * * *